United States Patent [19]

Bach et al.

[11] Patent Number: 4,940,692
[45] Date of Patent: Jul. 10, 1990

[54] TRANSFER OF DYES

[75] Inventors: Volker Bach, Neustadt; Ruediger Sens, Mannheim; Karl-Heinz Etzbach, Frankenthal; Manfred Ruske, Ludwigshafen, all of Fed. Rep. of Germany

[73] Assignee: Basf Aktiengesellschaft, Ludwigshafen, Fed. Rep. of Germany

[21] Appl. No.: 331,963

[22] Filed: Apr. 3, 1989

[30] Foreign Application Priority Data

Apr. 12, 1988 [DE] Fed. Rep. of Germany ....... 3812053

[51] Int. Cl.$^5$ .................. B41M 5/035; B41M 5/26
[52] U.S. Cl. .................. 503/227; 8/471;
8/679; 428/195; 428/913; 428/914; 552/238;
552/239; 552/251; 552/255; 552/260
[58] Field of Search .................. 8/471, 675, 679;
428/195, 913, 914; 503/227; 260/365, 371

[56] References Cited

U.S. PATENT DOCUMENTS

4,824,437  4/1989  Gregory .................. 8/471

FOREIGN PATENT DOCUMENTS

| 111004 | 6/1984 | European Pat. Off. | 503/227 |
|---|---|---|---|
| 227948 | 3/1984 | Japan | 503/227 |
| 53563 | 1/1985 | Japan | 503/227 |
| 151097 | 4/1985 | Japan | 503/227 |
| 0131294 | 7/1985 | Japan | 503/227 |
| 0172591 | 9/1985 | Japan | 503/227 |
| 283595 | 1/1986 | Japan | 503/227 |
| 199997 | 6/1986 | Japan | 503/227 |
| 237694 | 7/1986 | Japan | 503/227 |
| 127392 | 8/1986 | Japan | 503/227 |
| 3005993 | 1/1988 | Japan | 503/227 |

*Primary Examiner*—Bruce H. Hess
*Attorney, Agent, or Firm*—Oblon, Spivak, McClelland, Maier & Neustadt

[57] ABSTRACT

Heat transferable dyes which compared with the prior art show better solubility and/or higher light fastness and good to excellent transfer properties have the formula (I)

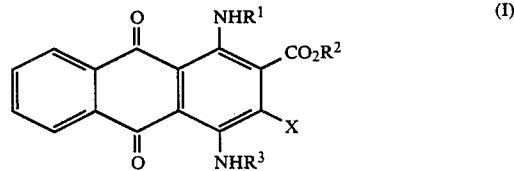

where X is H or CN, $R^1$, $R^2$, and $R^3$ independently of one another are alkyl, alkylcarbonyloxyalkyl, alkoxycarbonyloxyalkyl, alkoxycarbonylalkyl, haloalkyl, hydroxyalkyl, cyanoalkyl, unsubstituted or alkyl-or alkoxy-substituted phenyl or benzyl or a radical of the formula

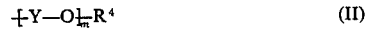

where Y is $C_2$–$C_6$-alkylene, m is 1 to 6 and $R^4$ is alkyl or phenyl, with the proviso that if X is H then $R^1$ and $R^3$ are each substituted or unsubstituted alkyl or substituted or unsubstituted phenyl or if X is H and $R^1$ is H, then $R^3$ must be substituted or unsubstituted phenyl.

7 Claims, No Drawings

TRANSFER OF DYES

In the transfer process, a transfer sheet or ribbon which contains a thermally transferable dye on a substrate with or without a binder is heated from the back with short (fractions of seconds) heating pulses from a thermal printing head, and a transfer recording takes places on a recording medium. The essential advantage of this process is that the amount of dye to be transferred, and hence the color gradation, is easily controllable by setting the energy to be transmitted to the thermal printing head.

In general, color recording is performed using the three subtractive primaries yellow, magenta and cyan (with or without black). For optimal color recording, the dyes must have the following properties:

solubility in customary organic solvents and in the coating material (binder) of the transfer sheet transferability at very low heat output from the thermal printing head high thermal and photochemical stability and resistance to moisture and chemical substances only little migration within or on the surface coating of the acceptor medium at room temperature guarantee preferred hues for subtractive color mixing no crystallization on storage of the transfer sheet ready industrial availability.

Most of the existing blue dyes used for thermal transfer printing do not meet these requirements to a sufficient degree.

There is prior art concerning dyes for this purpose. For instance, there is Japanese patent literature describing 1,4-diaminoanthraquinone dyes for the use according to the invention, for example:

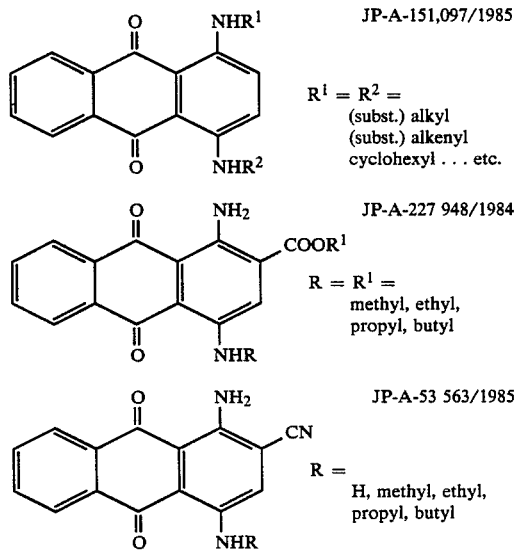

It is an object of the present invention to provide dyes for thermotransfer which are easily transferable under the application conditions of a thermal printing head show little if any migration in the image at room temperature do not crystallize out of the transfer sheet do not undergo thermal or photochemical decomposition are processible into printing inks/inked ribbons meet the coloristic requirements are readily available in industry.

We have found that this object is achieved by a process for transferring a dye from a substrate to an acceptor by means of a thermal printing head, which comprises using a substrate on which there is or are present one or more dyes of the formula I

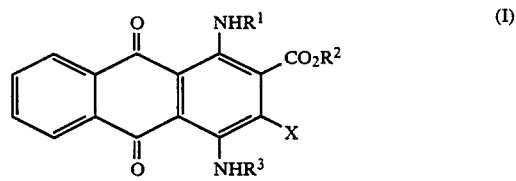

where
X is H or CN,
$R^1$, $R^2$ and $R^3$ independently of each other are linear or branched $C_1$–$C_{20}$-alkyl; alkylcarbonyloxyalkyl, alkoxycarbonyloxyalkyl, alkoxycarbonylalkyl, haloalkyl, hydroxyalkyl or cyanoalkyl, these substituted alkyls having up to 20 carbon atoms in total; unsubstituted or $C_1$–$C_{20}$-alkyl- or $C_1$–$C_{20}$-alkoxy-substituted benzyl or phenyl; or a radical of the general formula (II)

where
Y is linear or branched $C_2$–$C_6$-alkylene,
m is 1, 2, 3, 4, 5 or 6 and
$R^4$ is $C_1$–$C_4$-alkyl or phenyl,
with the proviso that if X is H, then $R^1$ and $R^3$ are each substituted or unsubstituted alkyl or substituted or unsubstituted phenyl, or if X is H and $R^1$ is H, then $R^3$ must be unsubstituted or alkyl- or alkoxy-substituted phenyl.

As well as in general better solubility and/or higher light fastness, the dyes (I) have surprisingly good to excellent transfer properties compared with the dyes used in existing processes although the dyes transferred in the process according to the invention have relatively high molecular weights compared with the dyes transferred in the prior art processes.

The transfer of dyes from the base to an acceptor layer is advantageous on using a base on which there is or are present one or more dyes of the formula (I)

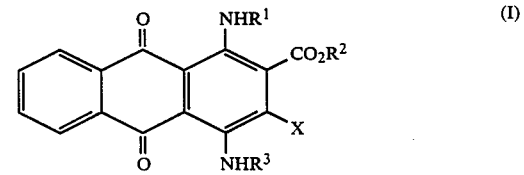

where
X is H or CN,
$R^1$, $R^2$ and $R^3$ independently of each other are linear or branched $C_1$–$C_{20}$-alkyl; alkylcarbonyloxyalkyl, alkoxycarbonyloxyalkyl, alkoxycarbonylalkyl, haloalkyl, hydroxyalkyl or cyanoalkyl having up to 20 carbon atoms; unsubstituted or $C_1$–$C_{20}$-alkyl- or $C_1$–$C_{20}$-alkoxy-substituted benzyl or phenyl; or a radical of the general formula (II)

where
Y is linear or branched $C_2$–$C_6$-alkylene,
m is 1, 2, 3, 4, 5 or 6 and
$R^4$ is $C_1$–$C_4$-alkyl or phenyl,
with the proviso that if X is H, then $R^1$ and $R^3$ are each substituted or unsubstituted alkyl or substituted or unsubstituted phenyl, or if X and $R^1$ are both H, then $R^3$ must be unsubstituted or alkyl- or alkoxy-substituted phenyl.

Preferably, the process according to the invention is carried out with a substrate on which there is or are present one or more dyes of the formula (III)

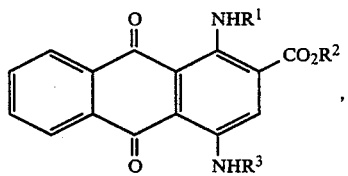  (III)

where
$R^1$ is linear $C_1$–$C_{15}$-alkyl,
$R^2$ is linear or branched $C_1$–$C_{15}$-alkyl or a radical of the general formula (IX)

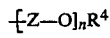  (IX), where
Z is linear or branched $C_2$–$C_4$-alkylene
n is 1, 2, 3 or 4 and
$R^4$ is $C_1$–$C_4$-alkyl or phenyl, and
$R^3$ is linear or branched $C_1$–$C_{15}$-alkyl or unsubstituted or $C_1$–$C_{15}$-alkyl- or $C_1$–$C_{15}$-alkoxy-substituted phenyl.

Particularly advantageous results are obtained by using one or more dyes of the formula (IV)

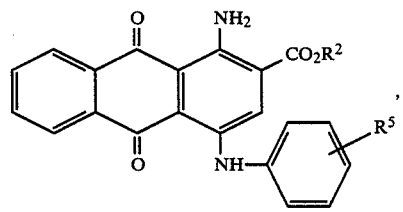  (IV)

where
$R^2$ is linear or branched $C_1$–$C_{15}$-alkyl or a radical of the general formula (IX)

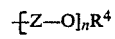  (IX), where
Z is linear or branched $C_2$–$C_4$-alkylene,
n is 1, 2, 3 or 4 and
$R^4$ is $C_1$–$C_4$-alkyl or phenyl, and
$R^5$ is linear $C_1$–$C_{15}$-alkyl or $C_1$–$C_{15}$-alkoxy.

Very particularly good results are obtained on employing one or more dyes of the formula (V)

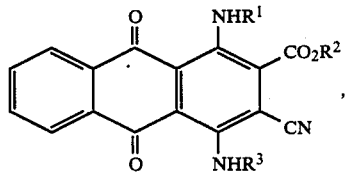  (V)

where
$R^2$ is linear or branched $C_1$–$C_{15}$-alkyl or a radical of the general formula (II)

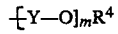  (II), where
Y is linear or branched $C_2$–$C_6$-alkylene,
m is 1, 2, 3, 4, 5 or 6 and
$R^4$ is $C_1$–$C_4$-alkyl or phenyl, and
$R^1$ and $R^3$ independently of each other are H, unsubstituted or $C_1$–$C_{15}$-alkyl- or $C_1$–$C_{15}$-alkoxy-substituted benzyl or phenyl, $C_4$–$C_{15}$-alkoxycarbonyloxyalkyl, $C_4$–$C_{15}$-alkoxycarbonyloxyalkyl, $C_4$–$C_{15}$-alkoxycarbonylalkyl, or equal to $R^2$.

Very particularly good results are obtained by employing dyes of the formula (V)

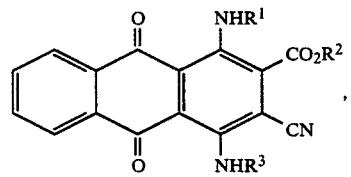  (V)

where one or more of the radicals $R^1$, $R^2$ and $R^3$ is

  (VI), where
n is 1, 2, 3 or 4 and
$R^4$ is $C_1$–$C_4$-alkyl or phenyl, and the remaining $R^1$, $R^2$ and $R^3$ are each linear or branched $C_1$–$C_{15}$-alkyl, where $R^1$ and/or $R^3$ may also be hydrogen.

Specific examples of linear or branched $C_1$–$C_{15}$-alkyl for $R^1$, $R^2$, and $R^3$ are: methyl, ethyl, n-propyl, n-butyl, pentyl, hexyl, heptyl, octyl, nonyl, decyl, dodecyl, tridecyl, tetradecyl, pentadecyl,

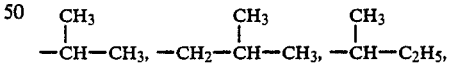

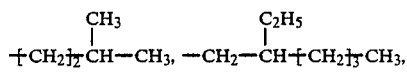

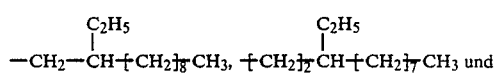

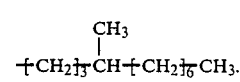

Specific examples of oxaalkyl for $R^1$, $R^2$ and $R^3$ are:

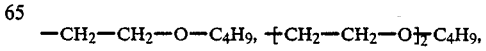

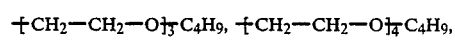

-continued

—CH$_2$—CH$_2$—O—Ph, $+$CH$_2$—CH$_2$—O$)_2$Ph, $+$CH$_2$—CH$_2$—O$)_3$Ph, $+$CH$_2$—CH$_2$—O$)_4$Ph, $+$CH$_2$—CH$_2$—O$)_2$CH$_3$, $+$CH$_2$—CH$_2$—O$)_2$C$_2$H$_5$, $+$CH$_2$—CH$_2$—O$)_2$C$_3$H$_7$, $+$CH$_2$—CH$_2$—O$)_3$C$_2$H$_5$, $+$CH$_2$—CH$_2$—O$)_4$C$_3$H$_7$   (Ph = Phenyl).

The present invention also provides novel dyes of the general formula (VII)

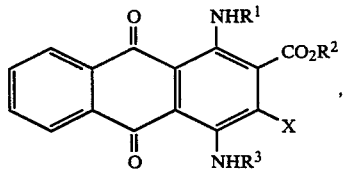
(VII)

where
X is CN and
R$^1$ is H, linear or branched C$_1$–C$_{20}$-alkyl, alkylcarbonyloxyalkyl, alkoxycarbonyloxyalkyl, alkoxycarbonylalkyl, haloalkyl, hydroxyalkyl or cyanoalkyl with up to 20 carbon atoms, or a radical of the general formula (II)

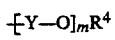   (II), where
Y is linear or branched C$_2$–C$_6$-alkylene,
m is 1, 2, 3, 4, 5 or 6 and
R$^4$ is C$_1$–C$_4$-alkyl or phenyl,
R$^2$ is a radical of the general formula (VIII)

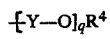   (VIII), where
Y is linear or branched C$_2$–C$_6$-alkylene,
q is 2, 3, 4, 5 or 6 and
R$^4$ is C$_1$–C$_4$-alkyl or phenyl, and
R$^3$ is unsubstituted or C$_1$–C$_{20}$-alkyl- or C$_1$–C$_{20}$-alkoxy-substituted phenyl or R$^3$ has the meaning of R$^1$, but R$^2$ may also be linear or branched C$_1$–C$_{15}$-alkyl when R$^1$ and/or R$^3$ are not hydrogen, or
X is H and
R$^1$ is linear or branched C$_1$–C$_{20}$-alkyl, alkylcarbonyloxyalkyl, alkoxycarbonyloxyalkyl, alkoxycarbonylalkyl, haloalkyl, hydroxyalkyl or cyanoalkyl each having up to 20 carbon atoms or a radical of the general formula (II)

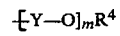   (II), where
Y is linear or branched C$_2$–C$_6$-alkylene,
m is 1, 2, 3, 4, 5 or 6 and
R$^4$ is C$_1$–C$_4$-alkyl or phenyl,
R$^2$ is linear or branched C$_1$–C$_{20}$-alkyl or a radical of the general formula (VIII)

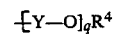   (VIII), where
Y is linear or branched C$_2$–C$_6$-alkylene,
q is 2, 3, 4, 5 or 6 and
R$^4$ is C$_1$–C$_4$-alkyl or phenyl, and
R$^3$ is unsubstituted or C$_1$–C$_{20}$-alkyl- or C$_1$–C$_{20}$-alkoxy-substituted phenyl or R$^3$ has the meaning of R$^1$, and R$^1$ may also be hydrogen when R$^3$ is unsubstituted or C$_1$–C$_{20}$-alkyl- or C$_1$–C$_{20}$-alkoxy-substituted phenyl.

To prepare the dyesubstrate required for the process, the dyes are processed in a suitable organic solvent, for example chlorobenzene, isobutanol, methyl ethyl ketone, methylene chloride, toluene, THF or a mixture thereof, together with one or more binders and with or without assistants into a printing ink. This printing ink preferably contains the dye in molecularly dispersed, ie. dissolved, form. The printing ink is applied to the inert substrate by means of a doctor blade and air-dried. Suitable binders are all resins or polymer materials which are soluble in organic solvents and are capable of binding the dye to the inert substrate in an abrasion-resistant bond. Preference is given to those binders which, after the printing ink has dried in the air, include the dye in the form of a clear transparent film from which the dye does not crystallize. Examples of such binder materials are cellulose derivatives, for example ethyl cellulose, ethylhydroxyethyl cellulose, hydroxypropyl cellulose, methyl cellulose, cellulose acetate or cellulose acetobutyrate, starch, alginates, alkyd resins, vinyl resins, polyvinyl alcohol, polyvinyl acetate, polyvinyl butyrate, polyvinylpyrrolidones and also polymers and copolymers of acrylates and derivatives thereof such as polyacrylic acid, polymethyl methacrylate, styrene-acrylate copolymers, polyester resins, polyamide resins, polyurethane resins and natural hydrocarbon resins such as gum arabic.

Preferred binders are ethyl cellulose and ethylhydroxymethyl cellulose in from medium to small viscosity formulations. Further suitable binders are described in DE-A-3,524,519.

The ratio of binder:dye varies preferably from 5:1 to 1:1. Preferable assistants are release agents as described in EP-A-227,092, EP-A-192,435 and the patent applications cited therein, and particular organic additives which prevent crystallization of the transfer dyes on storage and on heating of the inked ribbon, for example chlolesterol or vanillin. Inert substrates are for example silk, blotting or parchment paper and plastics films of high thermostability, for example uncoated or metal-coated polyester, polyamide or polyimide. The inert substrate may additionally be coated on the thermal printing head remote side with a lubricant-containing slipping layer in order to prevent adhesive bonding of the thermal printing head to the substrate material. Suitable lubricants are described for example in EP-A-216,483 and EP-A-227,095. The thickness of the dye substrate is from 3 to 30 μm, preferably from 5 to 10 μm.

For the dye acceptor layer it is basically possible to use any heat-resistant plastics layer which shows affinity for the dye to be transferred and whose glass transition temperature is ideally below 150° C., for example modified polycarbonates and polyesters. Suitable formulations for the acceptor layer composition are described in detail for example in EP-A-227,094, EP-A-133,012, EP-A-133,011 and EP-A-111,004 and in particular in JP-A-199,997/1986, JP-A-283,595/1986, JP-A-237,694/1986 and JP-A-127,392/1986.

The transfer is effected by means of a thermal printing head which must be heatable to ≧300° C. in order for the dye transfer to take place within the time range t: 0<t<15 msec. The dye transfers by migrating out of the transfer sheet and diffusing into the surface coating of the receiving medium.

Details of preparation can be found in the Examples, where parts and percentages are by weight, unless otherwise stated.

I. Preparation of the dyes and intermediates therefor. They are prepared in a conventional manner.

EXAMPLE 1

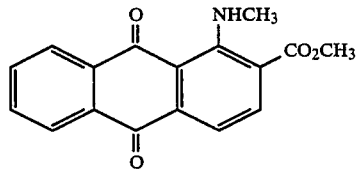

141 g of 2-carboxyl-1-methylaminoanthraquinone were treated in 1,000 ml of DMF in the presence of 207 g of $K_2CO_3$ with 142 ml of dimethyl sulfate at 70° C. for 7 hours. The reaction mixture was discharged into ice water/HCl and 2-methyloxycarbonyl-1-methylaminoanthraquinone was filtered off with suction and washed with water (yield>99% of theory; $\lambda_{max}$ ($CH_2Cl_2$): 510 nm).

The same method was used to obtain the anthraquinones mentioned in Table 1:

TABLE 1

| Example No. | | $\lambda_{max}$ ($CH_2Cl_2$) [nm] |
|---|---|---|
| 2 | O NHCH₃ CH₃ / CO₂CH—CH₃ (structure) | 511 |
| 3 | O NHCH₃ CH₃ / CO₂CH—C₂H₅ (structure) | 511 |
| 4 | CH₃ / NH—CH—CH₃ / CO₂CH—CH₃ / CH₃ (structure) | 511 |
| 5 | CH₃ / NH—CH—CH₃ / CO₂CH₃ (structure) | 511 |

EXAMPLE 6

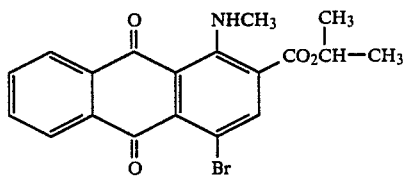

To 59.04 g of 2-isopropyloxycarbonyl-1-methylaminoanthraquinone in 800 ml of glacial acetic acid were added 44.3 g of anhydrous sodium acetate and catalytic amounts of potassium iodide. 20.5 ml of bromine were added dropwise at from 10° to 15° C. After 3 hours at from 15° to 20° C. the reaction mixture was filtered with suction, and the residue was washed with methanol/water ($\lambda_{max}$ ($CH_2Cl_2$): 518 nm).

The same method was used to obtain the bromoanthraquinones mentioned in Table 2:

TABLE 2

| Example No. | | $\lambda_{max}$ ($CH_2Cl_2$) [nm] |
|---|---|---|
| 7 | O NHCH₃ / CO₂CH₃ / Br (structure) | 518 |
| 8 | O NHCH₃ C₂H₅ / CO₂CH—CH₃ / Br (structure) | 518 |
| 9 | CH₃ / O NH—CH—CH₃ / CO₂CH—CH₃ / CH₃ / Br (structure) | 518 |
| 10 | CH₃ / O NH—CH—CH₃ / CO₂CH₃ / Br (structure) | 519 |

EXAMPLE 11

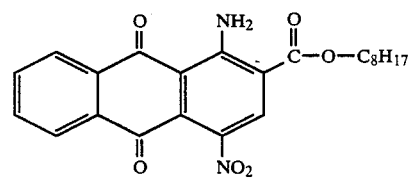

A mixture of 24 ml of n-octanol, 21.5 ml of triethylamine and 50 ml of toluene was admixed at room temperature with 49.6 g of 1-amino-2-chlorocarbonyl-4-nitroanthraquinone, and the mixture was heated to 50° C. and stirred for 90 minutes. After cooling down to room temperature, 200 ml of methanol were added, the precipitate was filtered off with suction and washed with water ($\lambda_{max}$ (CH$_2$Cl$_2$): 485 nm).

The same method was used to obtain the 1-amino-4-nitroanthraquinones mentioned in Table 3:

EXAMPLE 19

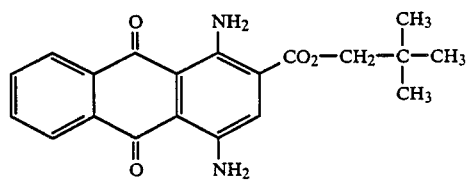

26.8 g of the dye of Example 13 in 125 ml of DMF were admixed in succession with 4.2 ml of triethylamine

TABLE 3

| Example No. | Structure | $\lambda_{max}$ [nm](CH$_2$Cl$_2$) |
|---|---|---|
| 12 | 1-NH$_2$-4-NO$_2$-anthraquinone-2-CO$_2$CH$_2$—CH(C$_2$H$_5$)+CH$_2$$\overline{\smash)}_{18}$CH$_3$ | 485 |
| 13 | 1-NH$_2$-4-NO$_2$-anthraquinone-2-CO$_2$CH—C(CH$_3$)$_3$ | 486 |
| 14 | 1-NH$_2$-4-NO$_2$-anthraquinone-2-CO$_2$+CH$_2$$\overline{\smash)}_{12}$CH(OCH$_3$)—CH$_3$ | 486 |
| 15 | 1-NH$_2$-4-NO$_2$-anthraquinone-2-CO$_2$+CH$_2$—CH$_2$—O$\overline{\smash)}_{13}$C$_4$H$_9$ | 486 |
| 16 | 1-NH$_2$-4-NO$_2$-anthraquinone-2-CO$_2$—CH$_2$—CH$_2$—O—C$_4$H$_9$ | 485 |
| 17 | 1-NH$_2$-4-NO$_2$-anthraquinone-2-CO$_2$+CH$_2$—CH$_2$—O$\overline{\smash)}_{12}$C$_4$H$_9$ | 484 |
| 18 | 1-NH$_2$-4-NO$_2$-anthraquinone-2-CO$_2$—CH$_2$—CH(C$_2$H$_5$)+CH$_2$$\overline{\smash)}_{13}$CH$_3$ | 484 | and 20.12 g of ascorbic acid and stirred at 100° C. for 3 hours. After cooling down to room temperature 700 ml of water were added, and the precipitate was filtered off with suction and washed with water ($\lambda_{max}$ (CH$_2$Cl$_2$): 621 nm).

The same method was used to obtain the 1,4-diaminoanthraquinones mentioned in Table 4:

EXAMPLE 27

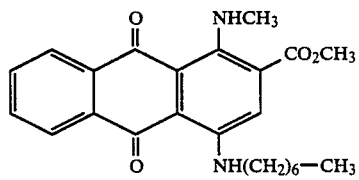

11.22 g of the dye of Example 7 in 100 ml of DMF were treated with 100 ml of n-heptylamine and 30 g of

TABLE 4

| Example No. | Structure | $\lambda_{max}$ [nm](CH$_2$Cl$_2$) |
|---|---|---|
| 20 | 1,4-diamino-2-(CO$_2$C$_8$H$_{17}$)-anthraquinone | 623 |
| 21 | 1,4-diamino-2-(CO$_2$CH$_2$—CH(C$_2$H$_5$)—(CH$_2$)$_8$CH)-anthraquinone | 620 |
| 22 | 1,4-diamino-2-(CO$_2$—(CH$_2$)$_2$—CH(OCH$_3$)—CH$_3$)-anthraquinone | 619 |
| 23 | 1,4-diamino-2-(CO$_2$—(CH$_2$—CH$_2$—O)$_3$C$_4$H$_9$)-anthraquinone | 621 |
| 24 | 1,4-diamino-2-(CO$_2$—(CH$_2$)$_2$—O—C$_4$H$_9$)-anthraquinone | 621 |
| 25 | 1,4-diamino-2-(CO$_2$—(CH$_2$—CH$_2$—O)$_2$C$_4$H$_9$)-anthraquinone | 621 |
| 26 | 1,4-diamino-2-(CO$_2$—CH$_2$—CH(C$_2$H$_5$)—(CH$_2$)$_3$CH$_3$)-anthraquinone | 622 | copper acetate at 100° C. for 3 minutes. The mixture was then cooled down, diluted with methanol and poured onto ice, and the precipitate was filtered off with suction ($\lambda_{max}$ (CH$_2$Cl$_2$): 667 nm).

The same method was used to obtain the anthraquinones mentioned in Table 5:

TABLE 5

| Example No. | Structure | $\lambda_{max}$ [nm](CH$_2$Cl$_2$) |
|---|---|---|
| 28 | 1-NHCH$_3$, 2-CO$_2$CH$_3$, 4-NHCH$_2$—CH(CH$_3$)—CH$_3$ anthraquinone | 667 |
| 29 | 1-NHCH$_3$, 2-CO$_2$CH$_3$, 4-NHC$_{12}$H$_{25}$ anthraquinone | 665 |
| 30 | 1-NHCH$_3$, 2-CO$_2$CH$_3$, 4-NHCH$_3$ anthraquinone | 666 |
| 31 | 1-NHCH$_3$, 2-CO$_2$CH$_3$, 4-NHC$_4$H$_9$ anthraquinone | 671 |
| 32 | 1-NHCH$_3$, 2-CO$_2$CH$_3$, 4-NH-(4-C$_{12}$H$_{25}$-phenyl) anthraquinone | 661 |
| 33 | 1-NHCH(CH$_3$)$_2$, 2-CO$_2$CH$_3$, 4-NH-(3-CH$_3$-phenyl) anthraquinone | 656 |
| 34 | 1-NH$_2$, 2-CO$_2$C$_8$H$_{17}$, 4-NH-(3-CH$_3$-phenyl) anthraquinone | 660 |

TABLE 5-continued
| Example No. | | λ$_{max}$ [nm](CH$_2$Cl$_2$) |
|---|---|---|
| 35 | 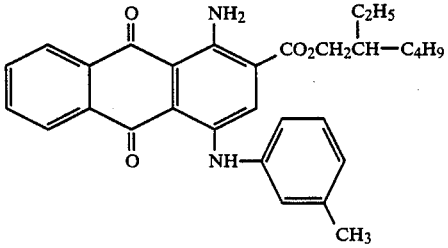 | 660 |
| 36 | 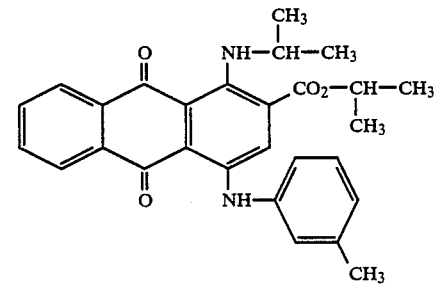 | 656 |
| 37 | 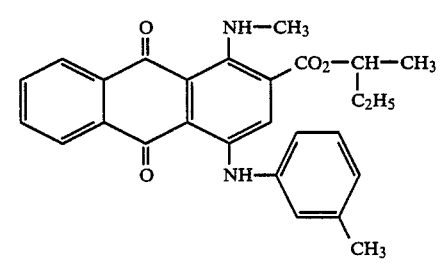 | 657 |
| 38 | 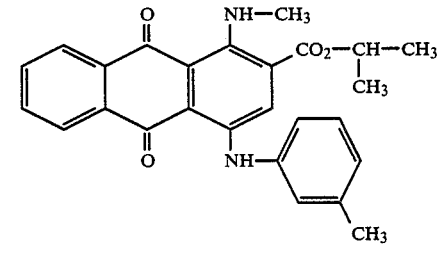 | 659 |
| 39 | 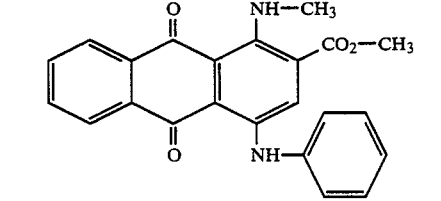 | 659 |
| 40 | 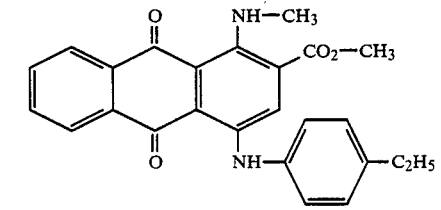 | 664 |

EXAMPLE 41

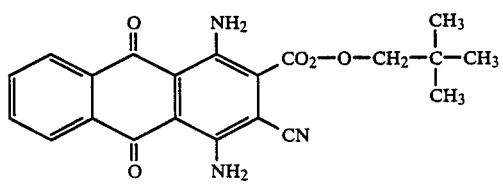

3.5 g of the dye of Example 19 were introduced into 60 ml of DMSO and admixed with 1.9 g of $NH_4HCO_3$ and 1.2 g of NaCN by stirring. After 5 minutes at 50° C. the flask contents were stirred into 700 ml of water, and the precipitate was filtered off with suction ($\lambda_{max}$ ($CH_2Cl_2$): 637 nm).

The same method was used to obtain the anthraquinones mentioned in Table 6:

TABLE 6

| Example No. | | $\lambda_{max}$ ($CH_2Cl_2$) [nm] |
|---|---|---|
| 42 | anthraquinone with $CO_2C_8H_{17}$, two $NH_2$, CN substituents | 635 |
| 43 | anthraquinone with $CO_2CH_2-CH(C_2H_5)-(CH_2)_3-CH_3$, two $NH_2$, CN | 638 |
| 44 | anthraquinone with $CO_2-(CH_2)_2-CH(OCH_3)-CH_3$, two $NH_2$, CN | 642 |
| 45 | anthraquinone with $CO_2-(CH_2-CH_2-O)_3-C_4H_9$, two $NH_2$, CN | 640 |
| 46 | anthraquinone with $CO_2-(CH_2)_2-O-C_4H_9$, two $NH_2$, CN | 638 |
| 47 | anthraquinone with $CO_2-(CH_2-CH_2-O)_2-C_4H_9$, two $NH_2$, CN | 640 |
| 48 | anthraquinone with $CO_2-CH_2-CH(C_2H_5)-(CH_2)_3-CH_3$, two $NH_2$, CN | 640 |

TABLE 6-continued

| Example No. | | $\lambda_{max}$ (CH$_2$Cl$_2$) [nm] |
|---|---|---|
| 49 | (structure: anthraquinone with O, NHCH$_3$, CO$_2$—CH$_3$, CN, NH—C$_{12}$H$_{25}$, O substituents) | 669 |

II. Transfer of dyes

To be able to test the transfer characteristics of the dyes in a quantitative and simple manner, the thermal transfer was effected with large-area hot plates instead of a thermal printing head, with the transfer temperature T being varied within the range 70° C.<T<120° C. and the transfer time t being fixed at 2 minutes.

(A) General recipe for coating the substrate with dye:

From 0.25 g to 2 g of binder are dissolved in from 5 to 10 ml of toluene or 8:2 (v/v) toluene/ethanol at from 40° to 50° C. To this is added a solution of 0.25 g of dye and from 0.01 g to 0.2 g of optional assistant in 3 to 8 ml of solvent, for example tetrahydrofuran, chlorobenzene, methyl ethyl ketone, toluene or a mixture thereof, by stirring. The print paste thus obtained is applied one or more times to a from 6 μm to 10 μm thick polyester sheet with a doctor blade from 30 μm to 80 μm and dried with a hair dryer.

(B) Testing of thermal transferability:

The dyes used were tested in the following manner: The donor polyester sheet containing the dye under test in the coated front is placed face down on a sheet of commercial acceptor Hitachi color video print paper and pressed down. Donor-acceptor are then wrapped with aluminum foil and heated between two hot plates at various temperatures T within the temperature range 70° C.<T<120° C. The amount of dye diffused into the dried plastics layer of the Hitachi color video print paper is proportional to the optical density (=absorbance A).

The latter is determined photometrically. If the logarithm of the absorbance (A) of the stained acceptor papers measured within the temperature range from 80° to 110° C. is plotted against the corresponding reciprocal absolute temperature, the result is a straight line from whose slope it is possible to calculate the activation energy $\Delta E_T$ for the transfer experiment by the following equation:

$$\Delta E_T = 2.3 \times R \times \frac{\Delta \log A}{\Delta \left[\frac{1}{T}\right]}$$

To complete the characterization, the temperature T*[°C.], where the absorbance A of the stained acceptor papers is equal to 1, is also taken from the blots.

The dyes mentioned in Table 7 below were processed by (A), and the dye-coated substrates obtained were tested in respect of their transfer characteristics by (B). The table lists for each dye the thermal transfer parameters T* and $\Delta E_T$ and the absorption maxima of the dyes $\lambda_{max}$, measured in methylene chloride the binders and assistants used, and the ratios of dye:binder:assistant.

TABLE 7

(Structure: anthraquinone with O, NHR$^1$, CO$_2$R$^2$, X, NHR$^3$, O substituents)

| Example No. | R$^1$ | R$^2$ | R$^3$ | X | $\lambda_{max}$ [nm] | B | HM | F:B:HM | T* [°C.] | $\Delta E_T$ [kcal/mol] |
|---|---|---|---|---|---|---|---|---|---|---|
| II.1 | H | CH$_2$—C(CH$_3$)$_3$ | H | CN | 637 | EC | — | 1:2 | 109.0 | 29.9 |
| II.2 | H | C$_8$H$_{17}$(n) | H | CN | 635 | EC | — | 1:2 | 99.1 | 29.9 |
| II.3 | H | CH$_2$—CH+CH$_2$$\frac{1}{3}$CH$_3$ / C$_2$H$_5$ | H | CN | 638 | EC | — | 1:2 | 93.0 | 27.4 |
| II.4 | H | [CH$_2$$\frac{1}{12}$CH—CH$_3$ / OCH$_3$ | H | CN | 642 | EC | — | 1:2 | 92.8 | 27.3 |
| II.5 | H | [CH$_2$—CH$_2$—O]$\frac{1}{3}$C$_4$H$_9$ | H | CN | 640 | EC | — | 1:2 | 79.6 | 14.1 |
| II.6 | H | [CH$_2$—CH$_2$—O]$\frac{1}{3}$C$_4$H$_9$ | H | CN | 640 | EHEC | — | 1:2 | 71.8 | 8.8 |
| II.7 | H | [CH$_2$—CH$_2$—O]$\frac{1}{3}$C$_4$H$_9$ | H | CN | 640 | EC | Chol | 1:2:0.75 | 76.0 | 16.3 |
| II.8 | H | [CH$_2$$\frac{1}{12}$O—C$_4$H$_9$ | H | CN | 638 | EC | — | 1:2 | 97.1 | 21.3 |
| II.9 | H | [CH$_2$—CH$_2$—O]$\frac{1}{3}$C$_4$H$_9$ | H | CN | 640 | EC | — | 1:2 | 85.7 | 17.6 |

TABLE 7-continued

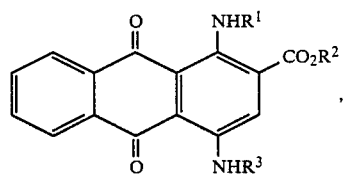

| Example No. | R[1] | R[2] | R[3] | X | λmax [nm] | B | HM | F:B:HM | T* [°C.] | ΔE_T [kcal/mol] |
|---|---|---|---|---|---|---|---|---|---|---|
| II.10 | H | CH$_2$—CH(C$_2$H$_5$)—[CH$_2$]$_3$CH$_3$ | H | CN | 640 | EC | — | 1:2 | 91.0 | 22.9 |
| II.11 | CH$_3$ | CH$_3$ | C$_{12}$H$_{25}$ | CN | 669 | EC | — | 1:2 | 107.4 | 21.2 |

B = binder
HM = assistant
EC = ethyl cellulose
EHEC = ethylhydroxyethyl cellulose
Chol = cholesterol
F = dye

We claim:

1. A process for transferring a dye from a substrate to an acceptor by applying heat by means of a thermal printing head to a substrate having an ink layer thereon of a binder and at least one dye of the formula (I):

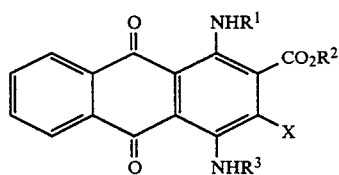   (I)

where
X is H or CN,
R[1], R[2] and R[3] independently of each other are linear or branched $C_1$–$C_{20}$-alkyl; alkylcarbonyloxyalkyl, alkoxycarbonyloxyalkyl, alkoxycarbonylalkyl, haloalkyl, hydroxyalkyl or cyanoalkyl, these substituted alkyls having up to 20 carbon atoms; benzyl or phenyl, where the phenyl radical of the benzyl and phenyl are unsubsituted or substituted by $C_1$–$C_{20}$-alkyl or $C_1$–$C_{20}$-alkoxy; or a radical of formula (II)

$\{Y-O\}_m R^4$   (II)

where
Y is linear or branched $C_2$–$C_6$-alkylene,
m is 1, 2, 3, 4, 5 or 6 and
R[4] is $C_1$–$C_4$-alkyl or phenyl,
with the proviso that if X is H, then R[1] and R[3] are each substituted or unsubstituted alkyl or substituted or unsubstituted phenyl, or if X is H and R[1] is H, then R[3] must be unsubsituted or alkyl- or alkoxy-substituted phenyl.

2. A process as claimed in claim 1, wherein there is or are present on the substrate one or more anthraquinone dyes of the formula (III)

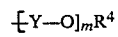   (III)

where
R[1] is linear $C_1$–$C_{15}$-alkyl,
R[2] is linear or branched $C_1$–$C_{15}$-alkyl or a radical of the general formula (II)

$\{Y-O\}_m R^4$   (II), where
Y is linear or branched $C_2$–$C_6$-alkylene
m is 1, 2, 3, 4, 5 or 6 and
R[4] is $C_1$–$C_4$-alkyl or phenyl, and
R[3] is linear or branched $C_1$–$C_{15}$-alkyl or unsubstituted or $C_1$–$C_{15}$-alkyl- or $C_1$–$C_{15}$-alkoxy-substituted phenyl.

3. A process as claimed in claim 2, wherein there is or are present on the substrate one or more anthraquinone dyes of the formula (IV)

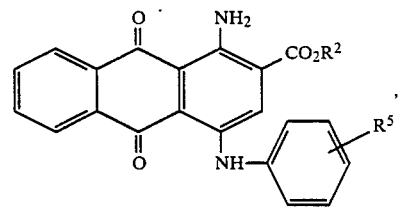   (IV)

where R[2] is as defined in claim 2 and R[5] is $C_1$–$C_{15}$-alkyl or $C_1$–$C_{15}$-alkoxy.

4. A process as claimed in claim 1, wherein there is or are present on the substrate one or more anthraquinone dyes of the formula (V)

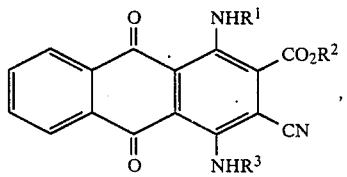 (V)

where
R² is linear or branched C₁–C₁₅-alkyl or a radical of the general formula (II)

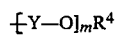 (II), where
Y is linear or branched C₂–C₆-alkylene,
m is 1, 2, 3, 4, 5 or 6 and
R⁴ is C₁–C₄-alkyl or phenyl, and
R¹ and R³ independently of each other are H, alkylcarbonyloxyalkyl, alkoxycarbonyloxyalkyl or alkoxycarbonylalkyl, these substituted alkyl radicals having up to 20 carbon atoms in total, phenyl or benzyl, where phenyl and the phenyl radical of the benzyl are unsubstituted or substituted by C₁–C₂₀-alkyl or C₁–C₂₀-alkoxy, or R¹ or R³ or R¹ and R³ each have the meaning of R².

5. A process as claimed in claim 4, wherein there is or are present on the substrate one or more dyes of the formula (V)

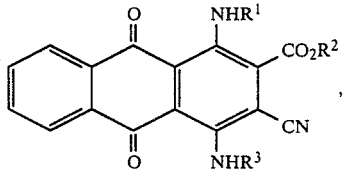 (V)

where R¹, R² and R³ independently of each other are linear or branched C₁–C₁₅-alkyl or radicals of the general formula (VI)

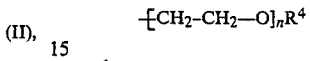 (VI)

where
n is 1, 2, 3 or 4 and
R⁴ is C₁–C₄-alkyl or phenyl, and where R¹ or R³ or R¹ and R³ may each also be hydrogen.

6. The process as claimed in claim 1, wherein said binder is a member selected from the group consisting of ethyl cellulose, ethylhydroxyethyl cellulose, hydroxypropyl cellulose, methyl cellulose, cellulose acetate, cellulose acetobutyrate, starch, alginate, alkyd resins, vinyl resins, polyvinyl alcohol, polyvinyl acetate, polyvinylbutyrate, polyvinylpyrrolidone, polymers and copolymers of acrylates, polyester resins, polyamide resins, polyurethane resins and natural hydrocarbon resins.

7. The process as claimed in claim 1, wherein the ratio of binder to dye in said ink layer ranges from 5:1 to 1:1.

* * * * *